United States Patent [19]
Taguchi et al.

[11] Patent Number: 5,745,464
[45] Date of Patent: Apr. 28, 1998

[54] EDGE POSITION DATA REPRODUCTION APPARATUS

[75] Inventors: Masakazu Taguchi; Haruhiko Izumi, both of Kawasaki, Japan

[73] Assignee: Fujitsu Limited, Kawasaki, Japan

[21] Appl. No.: 826,286

[22] Filed: Mar. 27, 1997

Related U.S. Application Data

[63] Continuation of Ser. No. 604,714, Feb. 21, 1996, abandoned.

[30] Foreign Application Priority Data

Dec. 6, 1995 [JP] Japan .................................. 7-145006

[51] Int. Cl.⁶ .................................................. G11B 7/00
[52] U.S. Cl. .......................... 369/59; 369/124; 369/48
[58] Field of Search ................................ 369/59, 58, 54, 369/48, 47, 124, 44.26

[56] References Cited

U.S. PATENT DOCUMENTS

| | | | |
|---|---|---|---|
| 5,420,893 | 5/1995 | Ward | 369/13 |
| 5,450,389 | 9/1995 | Hayashi | 369/59 |
| 5,490,127 | 2/1996 | Ohta et al. | 369/59 |
| 5,523,991 | 6/1996 | Mizokami et al. | 369/59 |
| 5,566,158 | 10/1996 | Kobayashi et al. | 369/275.4 |

FOREIGN PATENT DOCUMENTS 61-214278  9/1986  Japan.

*Primary Examiner*—Nabil Hindi
*Attorney, Agent, or Firm*—Greer, Burns & Crain, Ltd.

[57] ABSTRACT

A data reproduction apparatus for reproducing data corresponding to front and rear edges of marks is recorded in an optical disk. The apparatus includes an optical head for obtaining a reproduction waveform from the optical disk, an A/D converter for obtaining a real sampling value from the reproduction waveform so as to detect an ascending edge (or a descending edge), an interpolator for obtaining a descending edge (or ascending edge) calculate sampling value through interpolation using the real sampling value, and a maximum likelihood detector for detecting a maximum likelihood signal on the basis of a real sampling value and the interpolated sampling value.

12 Claims, 14 Drawing Sheets

EDGE POSITION DATA REPRODUCTION APPARATUS

This is a continuation of application Ser. No. 08/604,714, filed on Feb. 21, 1996 now abandoned.

BACKGROUND OF THE INVENTION

1. Field of the Invention

The present invention relates to an apparatus for reproducing data stored in an optical disk.

2. Description of Related Art

Recent accelerating development of multi-media is spotlighting the utility of optical disks as external storage media, and in line with an increase in the amount of record data, each disk is required to have a large storage capacity. The recording system in an optical disk is closely related to the storage density therein, and in order to increase the storage capacity, an edge position recording system is used.

The optical disks currently in use adopt a pit-position recording system where a record data corresponds to the center of a written-in record pit. There is another system called an edge-position recording system where a record data corresponds to both edges of the record pit. The edge-position recording system is advantageous in that the storage density can be increased in the direction of track about 1.5 times as compared with the pit position recording system.

FIGS. 1A and 1B show the relationship between the record data and the record pit formed on a track of an optical disk in the pit—position system and in the edge-position system, respectively. A record pit is formed at a place where a laser diode is lit in controlling lighting and extinguishing in accordance with a record data.

A re-write permit optical disk adopts a thermal record system, and the length of a record pit varies with environmental temperatures and record powers. This variation in length is called an "edge shift". More specifically, as shown in FIGS. 1A and 1B, when an environmental temperature is higher than an optimum temperature at the time of recording, the record pit becomes long. An edge shift does not seriously affect the pit-position recording system, but is likely to cause an erroneous data reproduction. For example, when the environmental temperature is extremely high at the time of recording, the length of a record pit is prolonged. If a front edge (ascending edge) and a rear edge (descending edge) are alternately detected, it is found that the detected rear edge is slightly behind an ideal rear edge position. This causes an error.

In order to solve the problem occurring in reproducing data under the edge-position recording system, a system for independently detecting a front edge and a rear edge is proposed, which is disclosed in Japanese Patent Application Laid Open No. 61-214278. This independent detection system is based, in theory, on the fact that a front edge and rear edge of a reproduction waveform have the same form (i.e. function), and in practice, detects signals representing a front edge and rear edge of a particular reproduction waveform independently. As a result, a timing clock is generated from each of the signals, and data is reproduced in accordance with each timing clock.

Referring to FIG. 2, a device used to perform the independent detection system will be more particularly described:

The system includes an optical disk 51 under which an optical head 52 is provided to obtain a reproduction signal which represents a record data in the optical disk 51. The optical head 52 outputs the reproduction signal to an amplifier 53 which amplifies it and outputs the amplified reproduction signal to a waveform equalizer 54. The waveform equalizer 54 shapes the waveform of the amplified reproduction signal, and delivers it to an edge detector 55. The edge detector 55 independently detects a front edge and a rear edge from the shaped reproduction signal, and outputs the detected front edge data to a discriminator 56a and a PLL circuit 57a, and outputs the detected rear edge data to a discriminator 57b and a PLL circuit 57b.

Each PLL circuit 57a and 57b generates a series of clock representing an ascending timing and a descending timing, and outputs them to the discriminators 56a and 57b, respectively. The discriminator 56a discriminates data at the timing of a clock synchronizing with the front edge reproduced in the PLL circuit 57a, and the discriminator 57b discriminates data at the timing of a clock synchronizing with the rear edge reproduced in the PLL circuit 57b. The discriminated data and clock are outputted to a synthesizer 58 which synthesizes them and outputs a synthesized signal to a demodulator 59. The demodulator 59 demodulates a final data from a data string to be inputted.

The operation will be described:

A reproduction signal obtained by the optical head 52 from the optical disk 51 is delivered to the edge detector 55 through the amplifier 53 and the waveform equalizer 54. The edge detector 55 independently detects a front edge and a rear edge by a second order differential method or a slicing method. The detected front edge data is discriminated by the discriminator 56a by a clock synchronizing with the front edge from the PLL circuit 57a. The detected rear edge data is discriminated by the discriminator 57b by a clock synchronizing with the rear edge from the PLL circuit 57b. Each of the discriminated data is synthesized by the synthesizer 58, and is demodulated by the demodulator 59. In this way a final data is obtained.

The independent detection of an ascending pulse edge and a descending edge pulse is advantageous in that data is reproduced irrespective of any edge shift (i.e. a variation in the length of a record pit). This is because variations in each edge pulse due to changes in the length of the record pit are considered to be constant throughout a series of record data. However, when a signal to be detected is considerably dense, the C/N (S/N) becomes too small to be considered, the second order differential method or the slicing method cannot accurately detect the edges.

In order to solve the problem, a partial response maximum likelihood (PRML) system is proposed. This PRML system demodulates information modulated and recorded in accordance with partial response characteristic by a maximum likelihood method (Viterbi decoding). More specifically, a signal with a limit of run-length which has been modulated in accordance with partial response characteristic is stored in an optical disk, and a reproduction signal obtained from the optical disk is sampled by an analog/digital (A/D) converter, and the transition of a maximum likelihood signal is fixed in accordance with a predetermined algorithm. A reproduction data is generated on the basis of the fixed transition of the signal.

Referring to FIG. 3, the reproduction structure of the PRML system will be more particularly described:

The PRML system includes an optical disk 1 under which an optical head 2 is provided to obtain a reproduction signal representing a record data in the optical disk 1. The optical head 2 outputs the reproduction signal to an amplifier 3. The amplifier 3 amplifies the inputted reproduction signal, and outputs it to an equalizer 4 which shapes the amplified reproduction signal and delivers it to a low-pass filter (LPF) 5. The LPF 5 cuts off high frequency portions of the reproduction signal beyond a predetermined value, and outputs low-frequency portions thereof to a front edge A/D converter 6a, a rear edge A/D converter 6b and a binary circuit 8. Each A/D converter 6a and 6b samples the shaped reproduction signal, and outputs the sampling value to a front edge maximum likelihood detector 7a and a rear edge maximum likelihood detector 7b. Each maximum likelihood detector 7a and 7b generates a front edge maximum likelihood signal and a rear edge maximum likelihood signal on the basis of the sampling value of the reproduction signal, and outputs it to the synthesizer 10.

The binary circuit 8 converts the shaped reproduction signal into a binary signal, for example, by using a predetermined slicing level, and after dividing it into a front edge signal and a rear edge signal, outputs each of them to a front edge PLL circuit 9a and a rear edge PLL circuit 9b. Each PLL circuit 9a and 9b generates a timing clock synchronizing with the reproduction signal on the basis of the binary signal, and outputs it to the respective A/D converter 6a and 6b, which samples the respective signal in synchronism with a timing clock from each of the PLL circuit 9a and 9b, and each maximum likelihood detector 7a and 7b generates a maximum likelihood signal in synchronism with a timing clock from each of the PLL circuit 9a and 9b. The synthesizer 10 synthesizes the front edge maximum likelihood signal and the rear edge maximum likelihood signal and outputs the synthesized signal to a demodulator 11. The demodulator 11 demodulates the synthesized signal to produce a final reproduction data.

The operation will be described:

A reproduction signal having a partial response characteristic corresponding to the maximum likelihood detection is obtained by the optical head 2 from the optical disk 1, and is delivered to the A/D converters 6a and 6b, and the binary circuit 8 through the amplifier 3, the equalizer 4 and the LPF 5. A binary signal after division of front edge and rear edge is delivered to the respective PLL circuit 9a, 9b from the binary circuit 8. A timing clock synchronizing with each binary signal is respectively delivered to the A/D converter 6a, 6b and the maximum likelihood detector 7a, 7b from the PLL circuit 9a, 9b. In accordance with the timing clock, the A/D converter 6a, 6b and the maximum likelihood detectors 7a, 7b are operated. Each of the A/D converter 6a and 6b obtains a sampling value, and each of the maximum likelihood detector 7a and 7b fixes the transition of the maximum likelihood signal from the sampling value in accordance with a predetermined algorithm. A front edge maximum likelihood signal and a rear edge maximum likelihood signal, both equivalent to the reproduction signal, are obtained on the basis of the fixed transition of the maximum likelihood signal. After the front edge maximum likelihood signal and the rear edge maximum likelihood signal are synthesized by the synthesizer 10, the synthesized signal is demodulated by the demodulator 11. A final reproduction data is obtained.

In the PRML data reproduction system described above the frequency of the timing clock generated in the PLL circuits 9a and 9b cannot be higher than about 20 MHz so long as the optical disks currently available are used. If a more dense data record is in need, a doubled or more frequency will be required. A high-speed, high-bit A/D converter is costly. As shown in FIG. 3, the PRML system requires two A/D converters, which reflects in the production cost. Since the timing clock required for the A/D converter to sample is equivalent to the channel clock of the optical disk, only a limited quantity of information is obtained by sampling a reproduction waveform.

SUMMARY OF THE INVENTION

It is an object of the present invention provide a data reproduction apparatus for reproducing data stored in the optical disk which can obtain a digital value (sampling value) for independently detecting a front edge and a rear edge with the use of a single A/D converter.

Another object of the present invention is to provide a data reproduction apparatus which can increase the amount of sampling information as compared with prior art data reproduction device.

In a preferred embodiment, a digital value is obtained through interpolation from a real sampling value for detecting a front edge (or a rear edge), so as to detect a rear edge (or a front edge). The front edge (or the rear edge) is detected by using the real sampling value, and the rear edge (or the front edge) is detected with the digital value. Under this arrangement a single A/D converter suffices to obtain a sampling value from the reproduction waveform. The present invention eliminates the necessity of using two expensive, high-speed A/D converters, thereby reducing the production cost.

In another preferred embodiment a first A/D converter is provided for a front edge and a second A/D converter is for a rear edge, and the sampling values obtained from the first and second A/D converters are used to calculate mutually interpolation digital values. The real sampling values are compensated with the interpolation digital values. The front edge and the rear edge are detected on the basis of the compensated values. Thus the amount of information used to detect a front edge and a rear edge is increased as compared with the prior art data reproduction device. As a result, a more sophisticated algorithm can be used to detect the required information, thereby enhancing the accuracy of the reproduction data.

The above and further objects and features of the invention will more fully be apparent from the following detailed description with the accompanying drawings.

DESCRIPTION OF THE PREFERRED EMBODIMENTS

The present invention will be described in greater detail by way of example by reference to FIGS. 4 to 14:

Embodiment 1

Figure 1A:
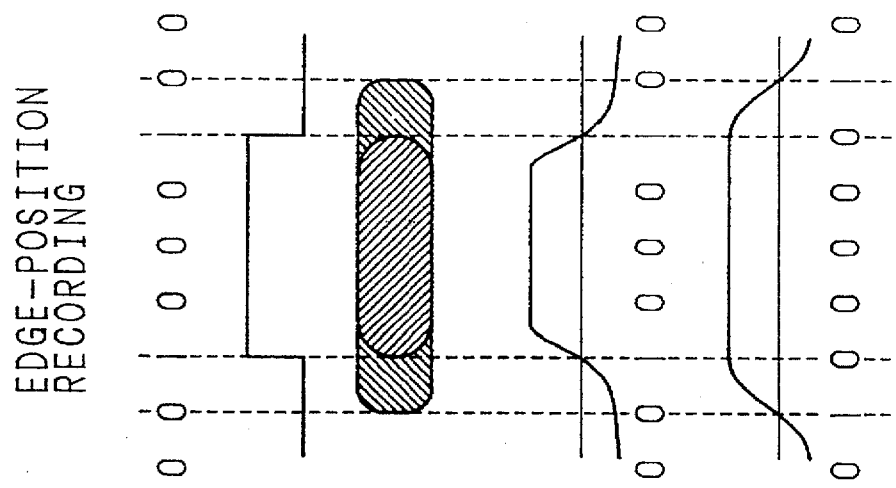
FIGS. 1A and 1B are diagrams showing the relationship among a record data, a record pit, and an edge shift.
Figure 1B:
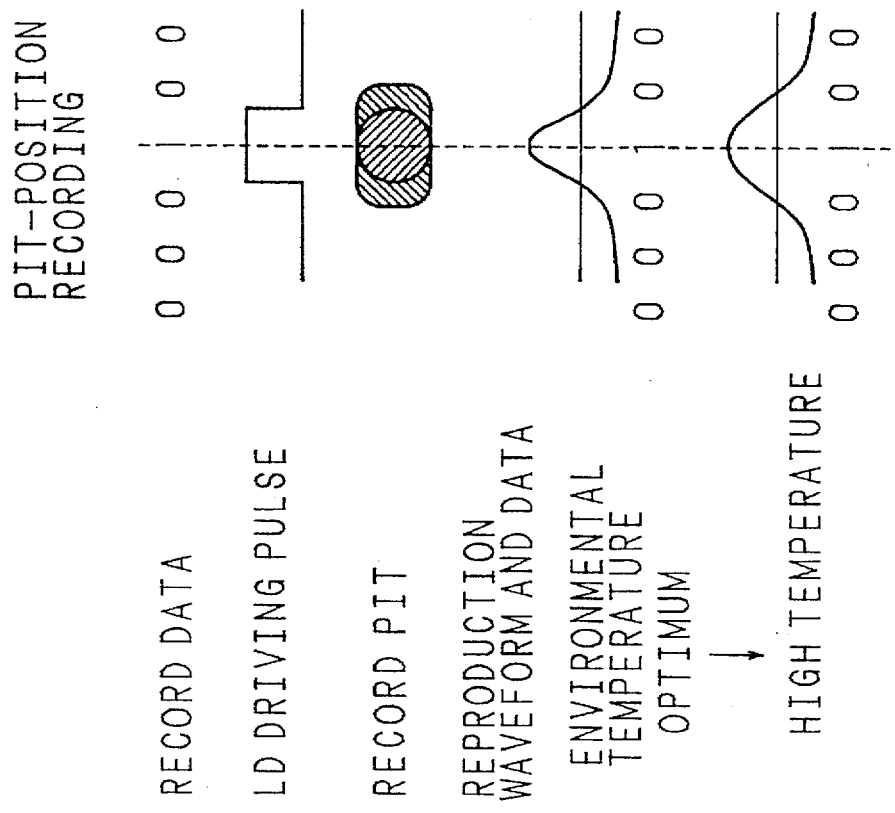
Figure 2:
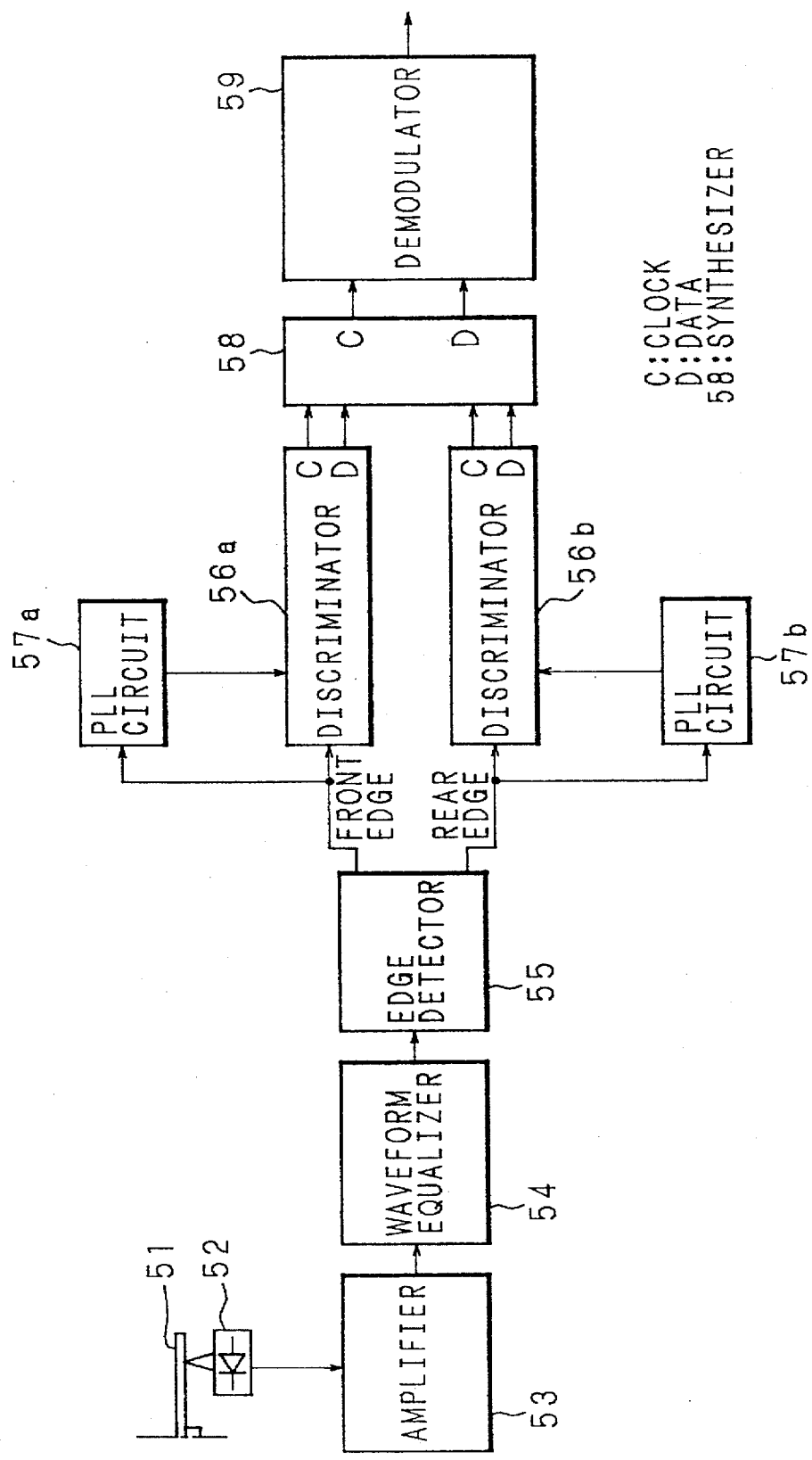
FIG. 2 is a diagrammatic view illustrating a structure of a prior art data reproduction device (a front edge and rear edge independent detection system)
Figure 3:
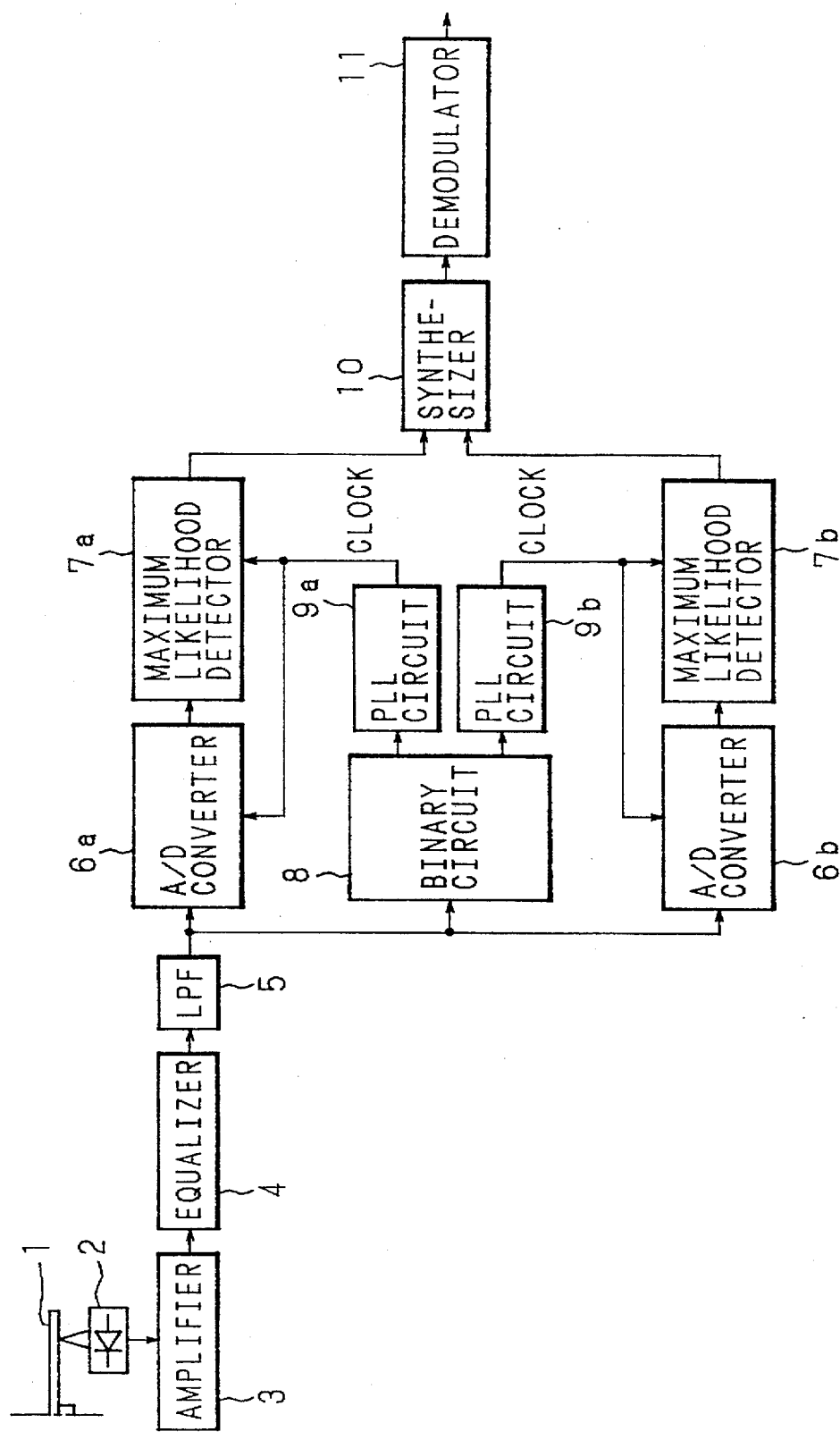
FIG. 3 is a diagrammatic view illustrating a structure of another prior art data reproduction device (maximum likelihood detection corresponding to a front edge and a rear edge independent detection system)
Figure 4:
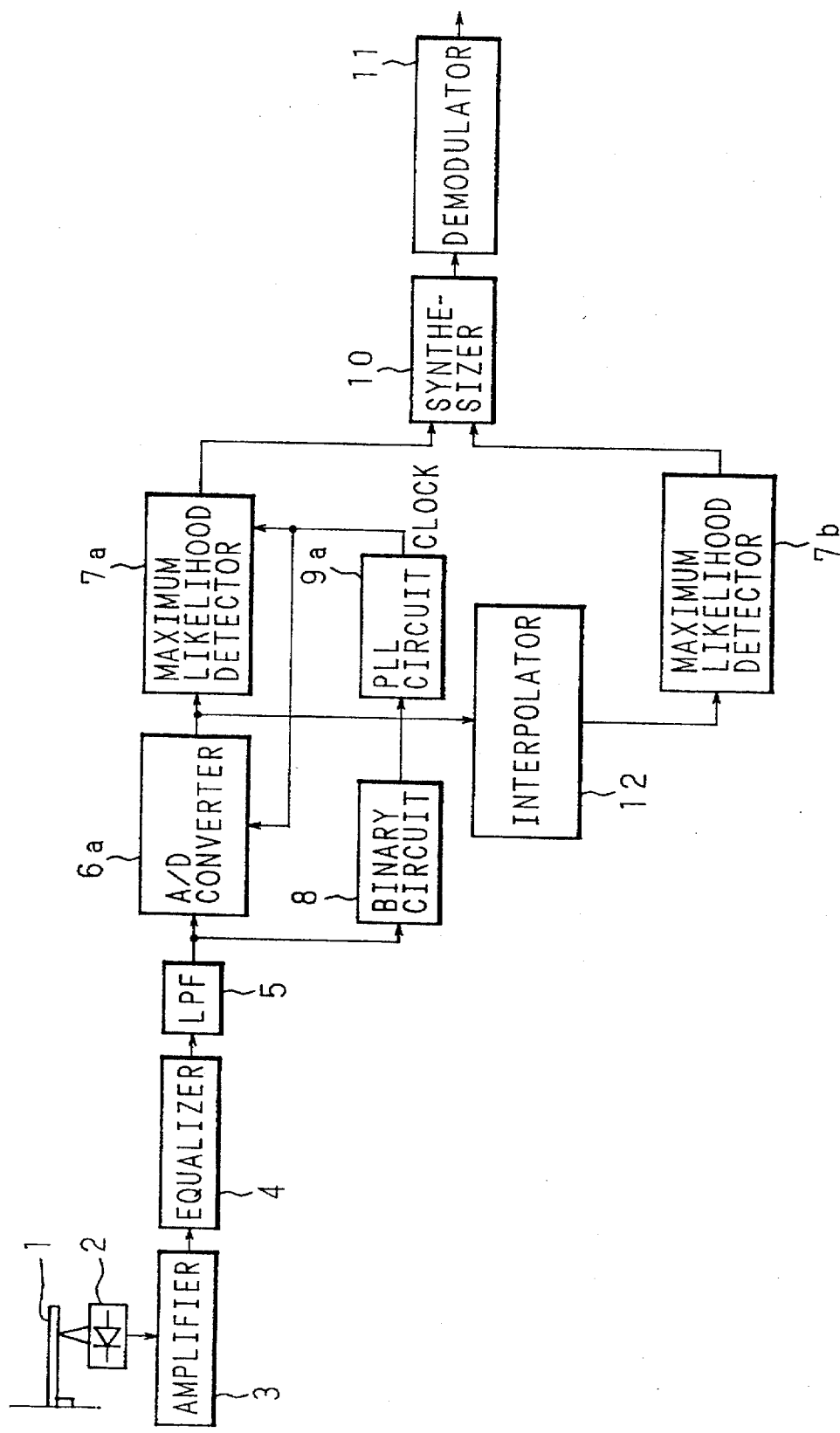
FIG. 4 is a diagrammatic view illustrating a structure of a data reproduction device according to the present invention (detection of a maximum Likelihood by a front edge system)

Referring to FIG. 4, the exemplary data reproduction device includes a single A/D converter 6a used for processing a front edge. A maximum likelihood signal representing the front edge is obtained from a real sampling value sampled by the A/D converter 6a, and a rear edge maximum likelihood signal is obtained on the basis of a digital value obtained through an interpolation of a sampling value obtained by the A/D converter 6a.

An optical disk 1 is provided under which an optical head 2 is provided to obtain a reproduction signal representing data recorded in the optical disk 1. The optical head 2 outputs the reproduction signal to an amplifier 3 which amplifies the reproduction signal inputted thereto and outputs it to an equalizer 4. The equalizer 4 shapes the wave of the amplified reproduction signal and delivers it to a LPF 5 which cuts off higher frequency portions of the signal than a predetermined value, and outputs low-frequency portions thereof to the A/D converter 6a and a binary circuit 8. The A/D converter 6a samples the shaped reproduction signal and outputs the sampling value both to a front edge maximum likelihood detector 7a, and an interpolator 12. The maximum likelihood detector 7a generates a maximum likelihood signal on the basis of the sampling value of the reproduction signal, and outputs it to a synthesizer 10.

The binary circuit 8 converts the shaped reproduction signal into a binary signal, for example, by using a slicing level, and outputs it to a PLL circuit 9a for the front edge. The PLL circuit 9a generates a timing clock synchronizing with the front edge on the basis of the binary signal, and outputs it to the A/D converter 6a and the maximum likelihood detector 7a. The A/D converter 6a samples the inputted signal, and the maximum likelihood detector 7a generates a maximum likelihood signal, synchronizing with the timing clock from the PLL circuit 9a, respectively.

The interpolator 12 determines a digital value (an interpolation sampling value) so as to detect a rear edge, through the interpolation using the sampling value from the A/D converter 6a, and outputs the interpolation sampling value to the rear edge maximum likelihood detector 7b. The maximum likelihood detector 7b generates a rear edge maximum likelihood signal on the basis of the interpolation sampling value, and outputs it to the synthesizer 10 which synthesizes the front edge and rear edge maximum likelihood signals, and outputs the synthesized signal to a demodulator 11. The demodulator 11 demodulates the signal obtained through a maximum likelihood process, and obtains a final reproduction data.

The operation of the embodiment will be described:

A reproduction signal having a partial response characteristic is obtained by the optical head 2 from the optical disk 1 and is delivered to the A/D converter 6a and the binary circuit 8 through the amplifier 3, the equalizer 4 and the LPF 5. Then the binary circuit 8 delivers the binary signal of the front edge to the PLL circuit 9a which delivers a timing clock synchronizing with the binary signal of the front edge to the A/D converter 6a and the maximum likelihood detector 7a. In response to the timing clock, the A/D converter 6a and the maximum likelihood detector 7a are operated. The A/D converter 6a determines a sampling value, and the maximum likelihood detector 7a fixes the transition of the maximum likelihood signal on the basis of the sampling value in accordance with a predetermined algorithm, and a front edge maximum likelihood signal is obtained on the basis of the fixed transition of the maximum likelihood signal.

The interpolator 12 determines an interpolation sampling value through an interpolation made on the basis of the front edge real sampling value obtained by the A/D converter 6a, and the resulting interpolation sampling value is delivered to the maximum likelihood detector 7b. The operation of the interpolator will hereinafter be described in detail. The maximum likelihood detector 7b fixes the transition of the maximum likelihood signal on the basis of the interpolation sampling signal value in accordance with a predetermined algorithm, and a rear edge maximum likelihood signal is obtained on the basis of the fixed transition of the signal. The resulting front edge and rear edge maximum likelihood signals are synthesized by the synthesizer 10, and then demodulated by the demodulator 11. In this way a final reproduction data is obtained.

Figure 5:
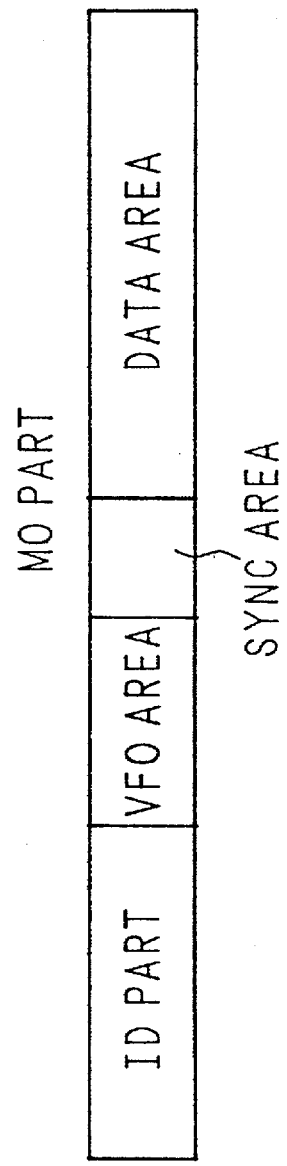
FIG. 5 is a recording format of the optical disk used in the present invention.

Now, the operation of the interpolator 12 will be described, wherein the interpolation is linear throughout the following embodiments:

First, referring to FIG. 5, which shows a basic format in the optical disk 1, the optical disk 1 stores information in sectors arranged therein. As shown in FIG. 5, the optical disk 1 includes an ID part storing information for specifying each sector, and an MO part consisting of a VF0 area, a SYNC area and a DATA area. The VF0 area and the SYNC area are arranged forwards of the DATA area in the MO part. The VF0 area stores a continuously repeated highest density pattern modulated in accordance with the partial response characteristic, and a pulse signal representing the highest density pattern is taken in the PLL circuit 9a and formed into a timing clock. The SYNC area stores a particular pattern representing the DATA area which stores a signal obtained by modulating a desired data in accordance with the partial response characteristic. In the optical disk 1 having the above-mentioned the recording format, an interpolation value is calculated from an ideal reproduction signal for the highest density pattern and a real reproduction signal containing an edge shift, and the sampling values of the SYNC area and the DATA area interpolated with the interpolation value.

Figure 6:
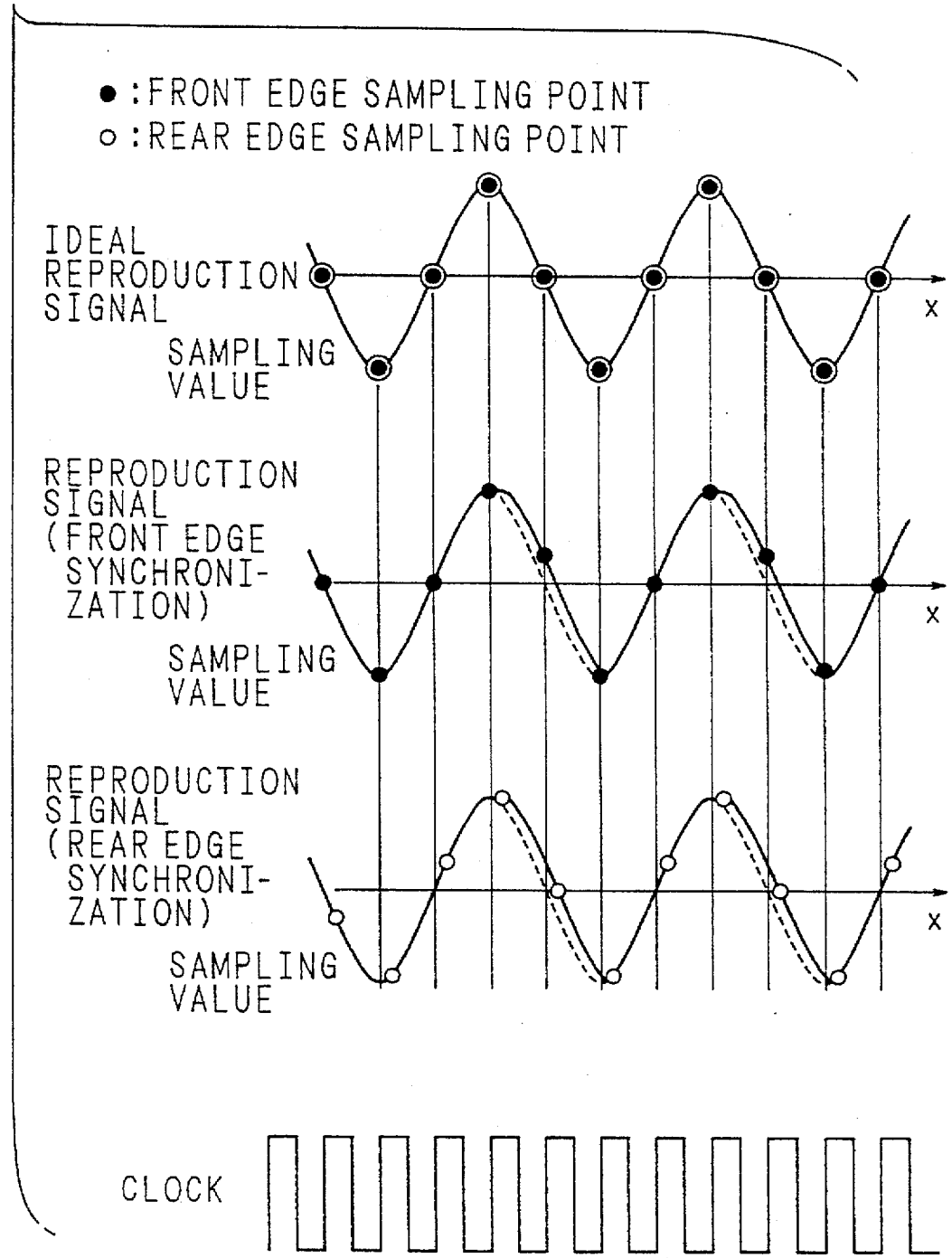
FIG. 6 is a view exemplifying the interpolation performed in the present invention.

FIG. 6 shows a relationship among the ideal reproduction signal for the highest density pattern, the sampling values and the interpolation values. In the case of an ideal reproduction signal as shown in FIG. 6(a) the front edge sampling value and the rear edge sampling value are in agreement. If the recording pattern is long and the record pit shifts longer because of the remaining heat of a laser diode emitting in writing, a stationary edge shift is likely to remain in the real reproduction signal because of having no relation to the length of a record pattern, even if the shift is removed to some extent by compensation depending upon the length of the record pattern. As shown in FIG. 6(b), when sampling is performed by a clock synchronizing with a front edge binary signal, a group of sampling values are obtained at the spots marked ●. A group of sampling values at the spots marked ○ as shown in FIG. 6(c) which are sampled by a clock synchronizing with the rear edge binary signal are obtained by the calculation of the interpolator 12 using the group of sampling values at the spots marked ●.

Figure 7:
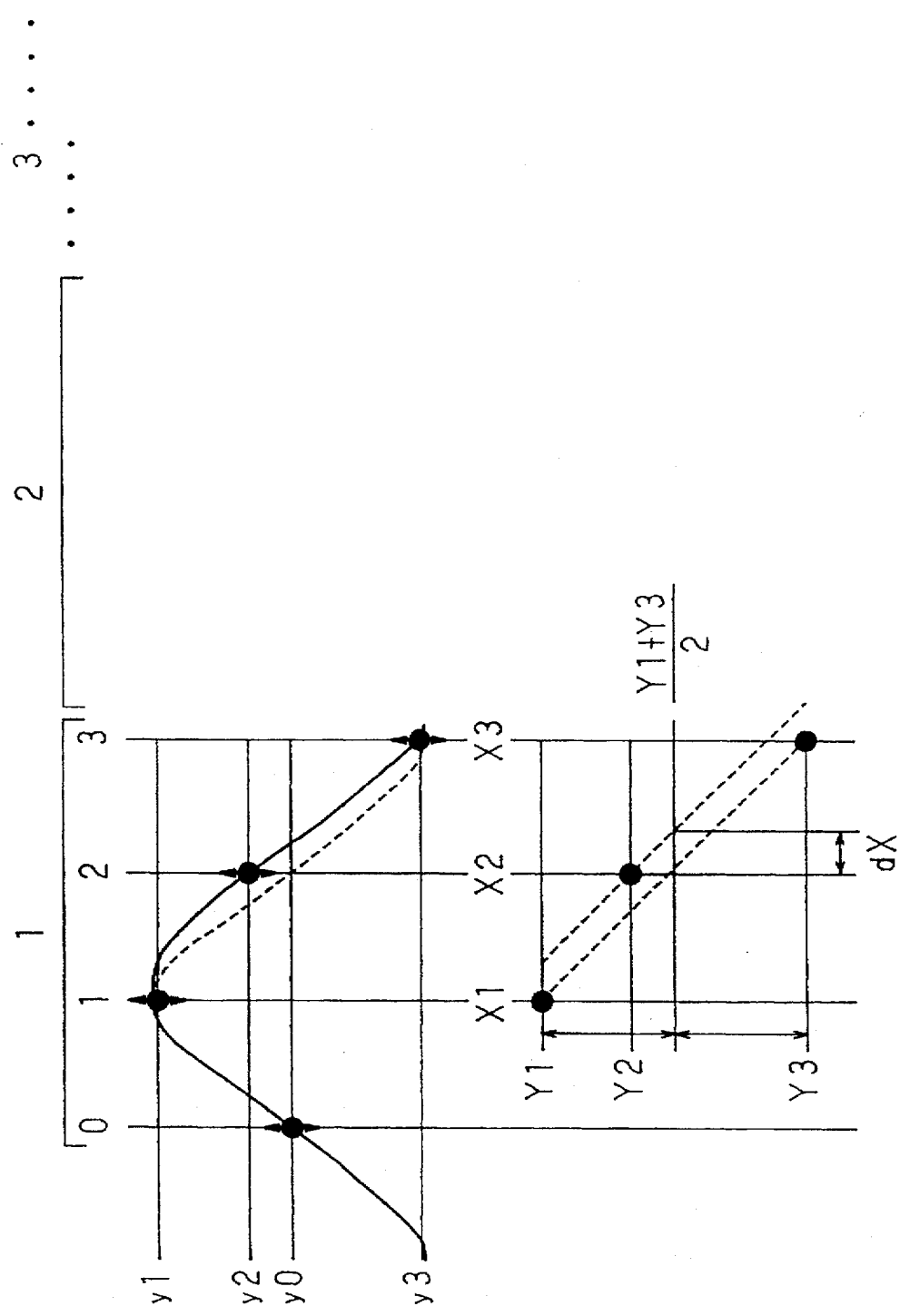
FIG. 7 is a view showing an example of a fixed stationary shift amount.

Referring to FIG. 7, the theory of obtaining a stationary shift amount from the VF0 area will be described by way of example:

The code modulation will be explained using a code (1, 7). Since the VF0 area is a densest signal block, four sampling values are obtained per cycle by sampling by a clock. Suppose that four points of a sampling time in one cycle are X0, X1, X2 and X3, and that one cycle constitutes a unit group. Suppose that the sample values corresponding to the sampling time X0, X1, X2 and X3 are $y_{o1}, y_{11}, y_{21}$ and $Y_{31}$, and that the sampling values in a second group are $y_{o2}$), $y_{12}, y_{22}$ and $y_{32}$. The same supposition applies to a third group and thereafter.

In FIG. 7, average values Y1, Y2 and Y3 for the sampling time are obtained from the sampling values in an n-number of groups. More specifically, they are obtained from the following equations (1) to (3):

$$Y1=(y_{11}+y_{12}+y_{13}+\ldots+y_{1n})/n \quad (1)$$

$$Y2=(y_{21}+y_{22}+y_{23}+\ldots+y_{2n})/n \quad (2)$$

$$Y3=(y_{31}+y_{32}+y_{33}+\ldots+y_{3n})/n \quad (3)$$

If it is presumed that a gradient of the line passing through the points (X1, Y1) and (X3, Y3) is a, the gradient a is determined by the following, equation (4):

$$a=(Y1-Y3)/(X1-X3) \quad (4)$$

Furthermore, if it is presumed that on the premise of a gradient a, a y intercept of the line passing a point (X2, Y2) is b, the y-intercept b is determined by the equation (5):

$$b=Y2-a\times X2 \quad (5)$$

Therefore, a line in parallel with the line passing through the points (X1, Y1) and (X3, Y3) and passing through the point (X2, Y2) is expressed by the equation (6)

$$y=\{(Y1-Y3)/(X1-X3)\}\times x +[Y2-\{(Y1-Y3)/(X1-X3)\}\times 2] \quad (6)$$

A deviation between X2 and the x coordinate of an intersection between the Line indicated by the equation (6) and the line expressed by y=(Y1+Y3)/2 is a stationary shift amount. This stationary shift amount dX can be calculated by the equation (7) below:

$$dX=X2+\{(X1-X3)/(Y1-Y3)\}\times (Y1+Y3-2\times Y2)/2\} \quad (7)$$

In the above-mentioned arithmetic processing it is presumed for simplicity that X1=−1, X2=0, and X3=1. The gradient a and the y-intercept b are respectively ex-pressed by the following equation (8):

$$a=(Y1-+Y3)/2, b=Y2 \quad (8)$$

The equation of the line passing through the point (X2, Y2), which corresponds to the equation (6), is expressed by the equation (9), and a stationary shift amount dX is calculated by the following equation (10).

$$y=\{(-Y1+Y3)/2\}\times X+Y2 \quad (9)$$

$$dX=(Y1+Y3-2\times Y2)/(-Y1\times Y3) \quad (10)$$

If it is presumed that the y intercept in dX is Y0 which is an average value of a n-number of sampling values $y_{o1}, y_{o2}, y_{o3}, \ldots y_{On}$, at the sampling time X0, a stationary shift amount dX is calculated by the equation (11):

$$dX=\{2\times (Y0-Y2)\}/(-Y1+Y3) \quad (11)$$

In this way the stationary shift amount dX is determined in the VF0 area.

Figure 8:
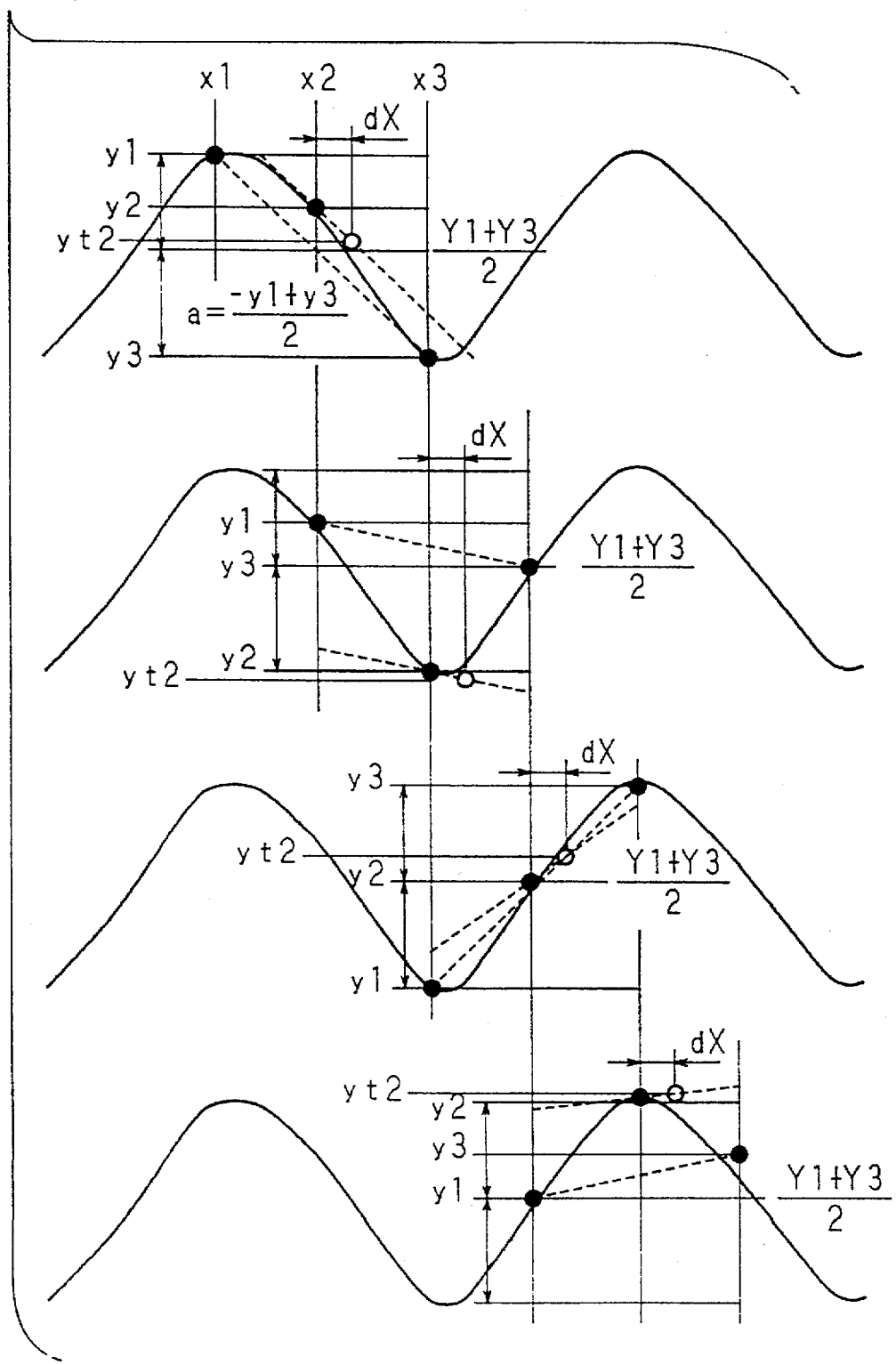
FIG. 8 is a view showing an example of an interpolation performed in the densest signal.
Figure 9:
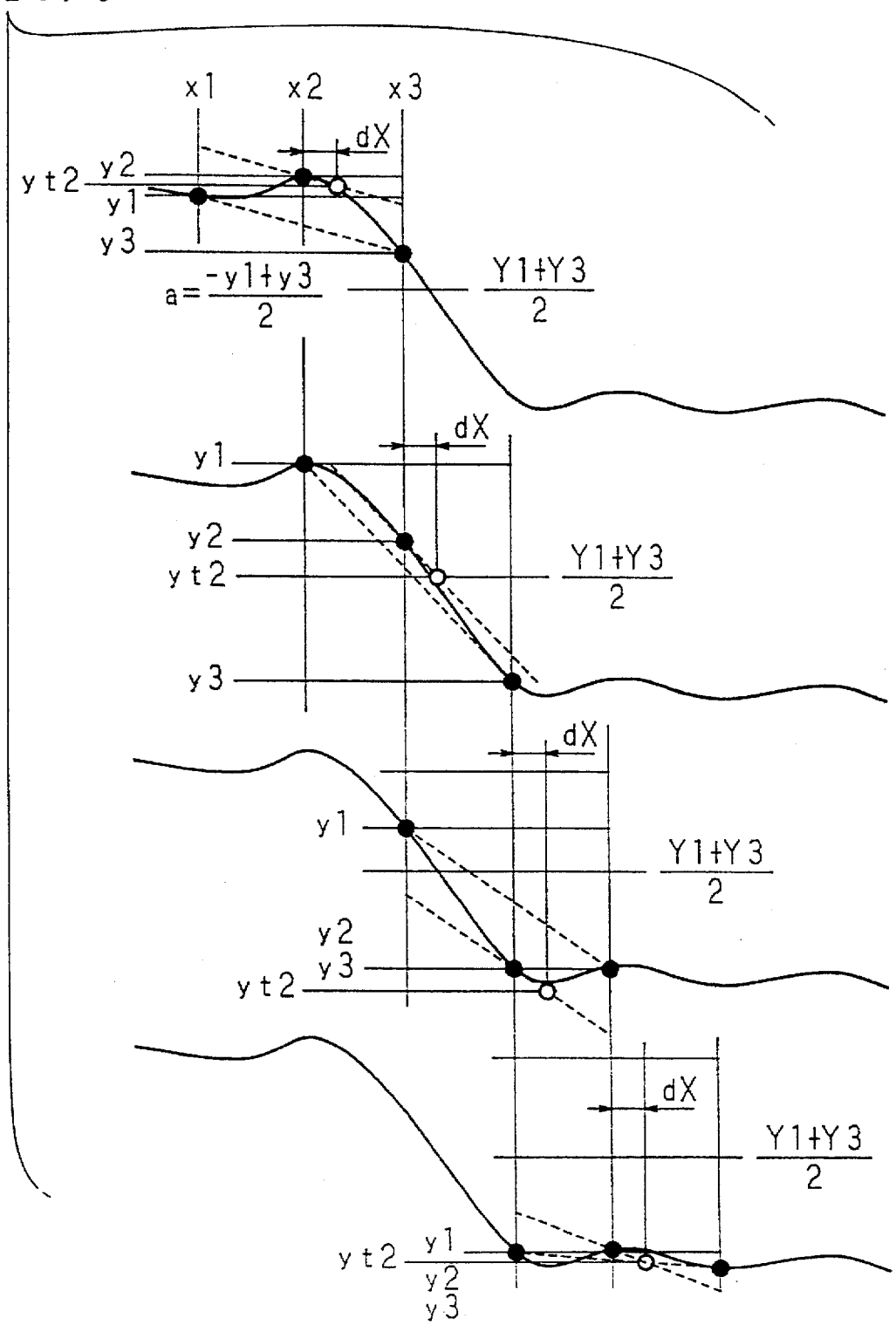
FIG. 9 is a view showing an example of an interpolation performed in the descending edge of a low-range signal.
Figure 10:
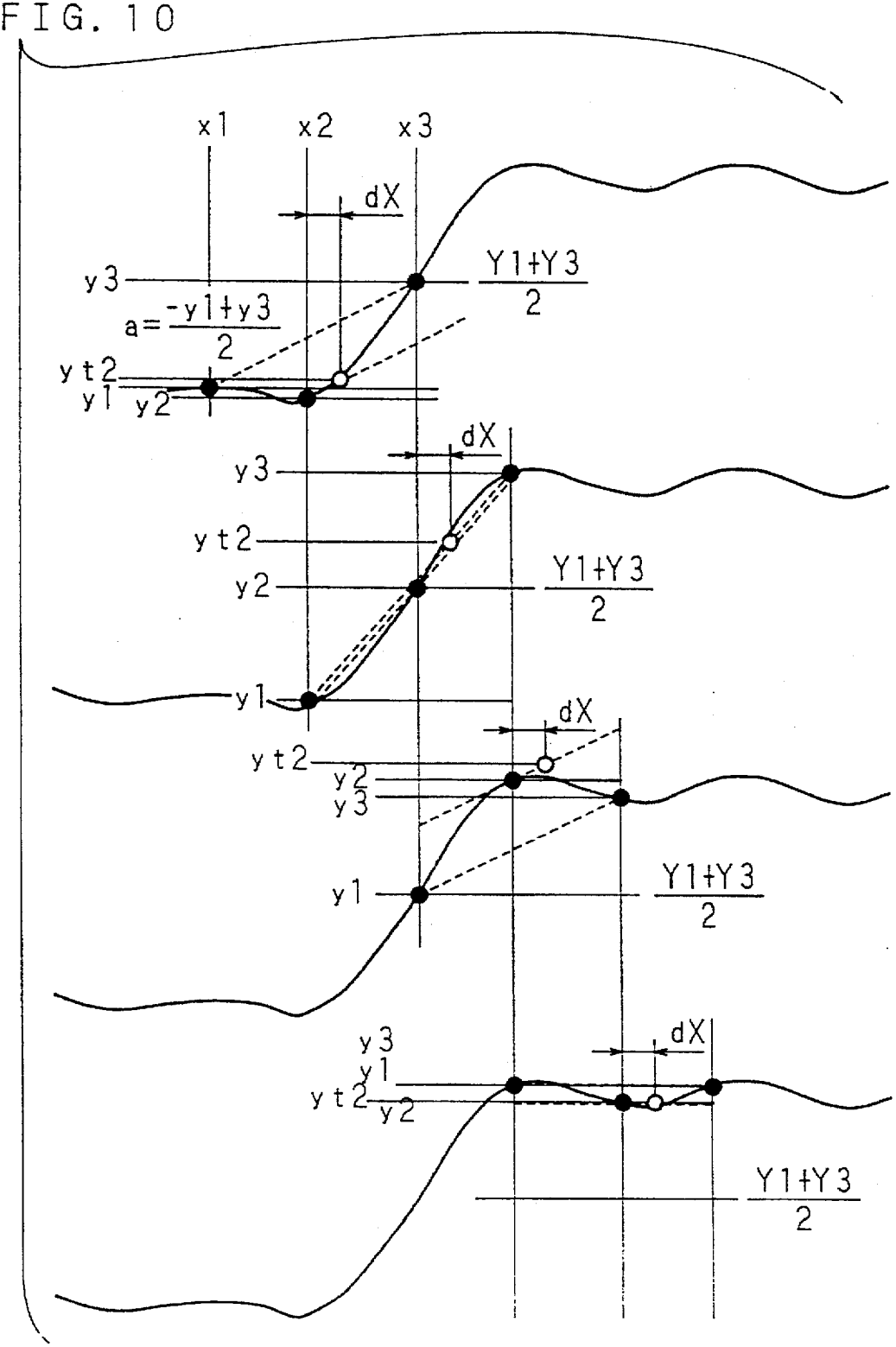
FIG. 10 is a view showing an example of an interpolation performed in the ascending edge of a low-range signal.

Next, referring to FIG. 8, an example of the interpolation performed in the DATA area using the stationary shift amount dX is described. In FIG. 8(a), it is presumed that the sampling values at sampling points of time x1, x2 and x3 in the DATA area are y1, y2 and y3. Sampling values obtained from a point of time (x2) to be interpolated and points of time (x1, x3), which are respectively after and before (x2), are used to perform interpolation. In FIG. 8(a) a gradient a is calculated from the sampling values y1 and y3 at the sampling points of time x1 and x3, and the equation of a line passing through the y-inception y2 is sought, and a stationary shift amount determined in the VF0 area is put in the equation to obtain an interpolation value. The process is specifically shown as follows:

It is presumed that the gradient a of a line in parallel with the line passing through the points (x1, y1) and (x3, y3), and passing through the point (x2, y2) and a y-inception b are obtained by the equation (12):

$$a=(-y1+y3)/2, b=y2 \quad (12)$$

Therefore, the equation of the line passing through the point (x2, y2) is expressed as follows:

$$y=\{(-y1+y3)/2\}\times x+y2 \quad (13)$$

By substituting the -x in the equation (13) by the stationary shift amount dX in the equation (10), an interpolated sampling value yt2 at a spot deviated by dX from the point x2 is obtained wherein the interpolated sampling value yt2 is expressed by the equation (14):

$$yt2=\{(-y1+y3)/2\}\times \{(Y1+Y3-2x\ Y2)/(-Y1+Y3)\}+y2 \quad (14)$$

FIGS. 8(b), 8(c) and 8(d) show an example where an interpolation sampling value yt2 is obtained at spots deviated clock by clock from the state shown in FIG. 8(a). The interpolation is performed in the same manner as in FIG. 8(a).

FIGS. 9(a) to 9(d) are views showing various aspects of an example of an interpolation performed in the descending edge of a low frequency signal portion, and FIGS. 10(a) to 10(d) are views showing various aspects of an example of an interpolation performed in the ascending edge of a low-frequency signal portion. The interpolation in the low-frequency signal portion is performed in the same manner as that performed for the densest signal, and the description of it will be omitted.

Figure 11:
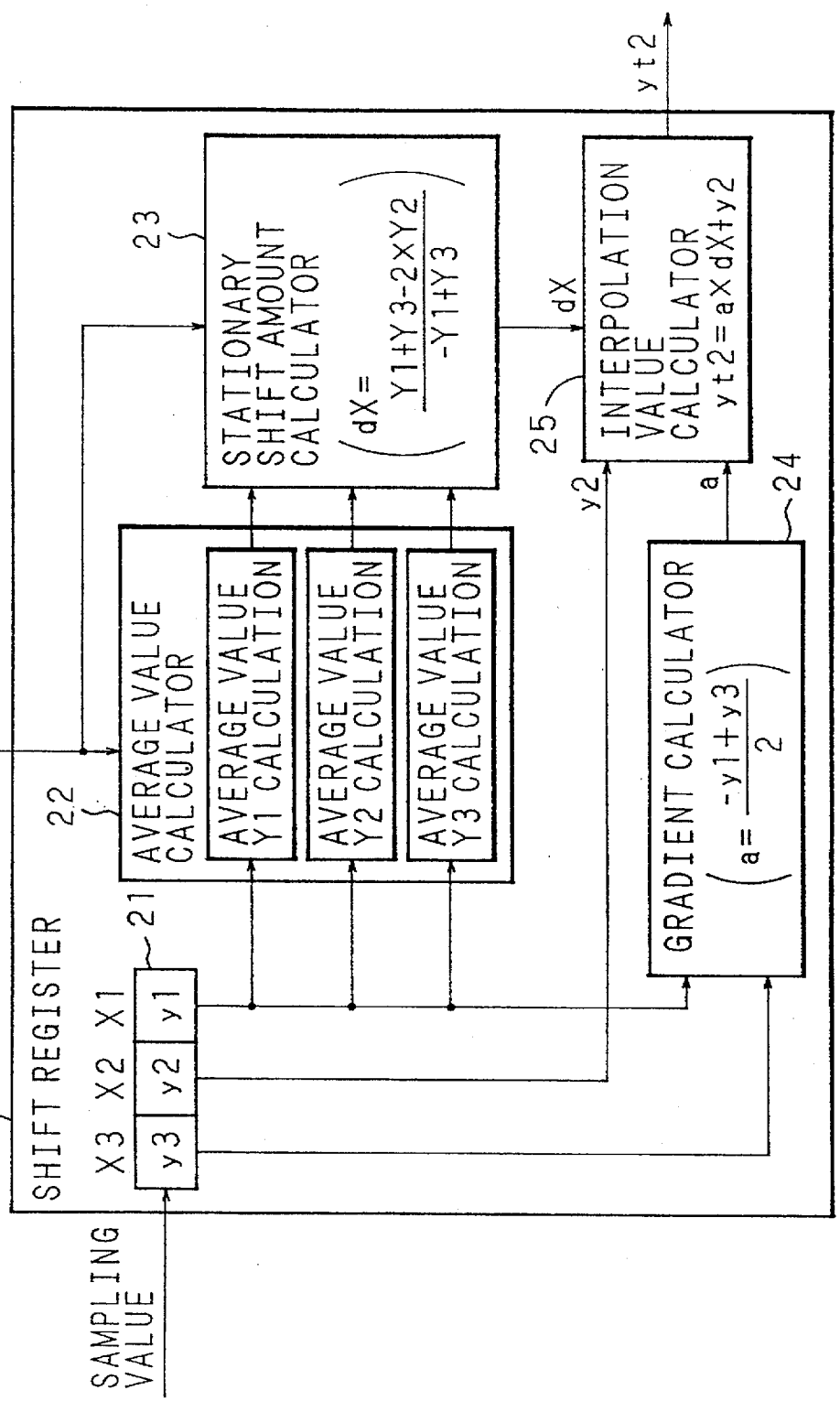
FIG. 11 is a block diagram illustrating the structure of an interpolator.

Referring to FIG. 11, the structure of the interpolator 12 will be described:

The interpolator 12 includes a shift register 21, an average value calculator 22, a stationary shift amount calculator 23, a gradient calculator 24, and an interpolation value calculator 25. The shift register 21 stores sampling values y1, y2 and y3 obtained by the A/D converter 6a in each group at the sampling points of time X1, X2 and X3. The average value calculator 22 receives sampling values in a repeated densest signal from the shift register 21 and calculates the average values Y1, Y2 and Y3 indicated by the equations (1) to (3). The stationary shift amount calculator 23 calculates the stationary shift amount dX indicated in the equation (10) by using the obtained average values Y1, Y2 and Y3. The gradient calculator 24 receives the sampling values y1 and y3 inputted from the shift register 21, and calculates the gradient a indicated in the equation (12). The interpolation value calculator 25 calculates the interpolation sampling value yt2 indicated in the equation (14) by using the sampling value y2 from the shift register 21, the stationary shift amount dX from the stationary shift amount calculator 23, and the gradient a from the gradient calculator 24.

The operation of the interpolator 12 will be described:

A sampling value sampled in the front edge phase is stored in the shift register 21. Between the open gates in the VF0 area, the average values Y1, Y2 and Y3 are calculated by the average value calculator 22 and the stationary shift amount dX is calculated by the stationary shift amount calculator 23, and then these calculated values are latched. Then, in the SYNC area and the DATA area the arithmetic operations indicated in the equations (12) to (14) are executed by the gradient calculator 24 and the interpolation value calculator 25, and the interpolation sampling value yt2 for detecting the rear edge is outputted to the rear edge maximum likelihood detector 7b. The interpolation sampling value yt2 obtained in this way is used to detect a rear edge maximum likelihood signal by the maximum likelihood detector 7b.

Embodiment 2

In Embodiment 2 the rear edge maximum likelihood signal is obtained from a real sampling value and a front edge maximum likelihood signal is obtained from the interpolated interpolation sampling value, in contrast with the Embodiment 1 where the front edge maximum likelihood signal is obtained from a real sampling value and the rear edge maximum likelihood signal is obtained from the interpolated interpolation sampling value. More specifically, a single A/D converter is provided solely for the rear edge, and the rear edge maximum likelihood signal is obtained from a real sampling value sampled by the A/D converter, and the front edge maximum likelihood signal is obtained from a digital value obtained by interpolating a sampling value by the A/D converter.

Figure 12:
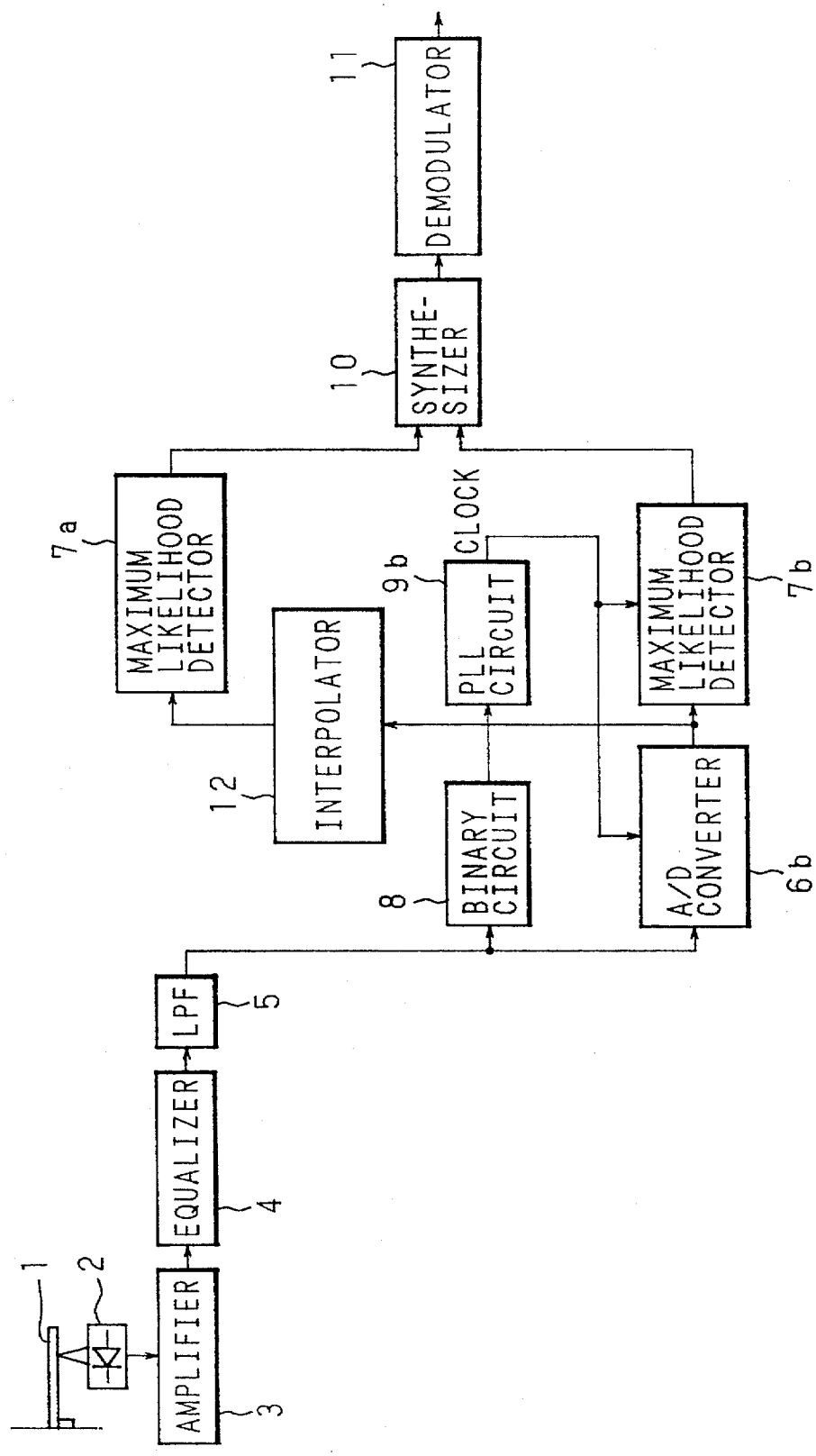
FIG. 12 is a diagrammatic view illustrating a structure of another embodiment (detection of a maximum likelihood by a rear edge system)

Referring to FIG. 12, the Embodiment 2 will be more particularly described, in which like reference numerals designate like elements and components to those in FIG. 4:

A waveshaped reproduction signal from the LPF 5 is inputted to the A/D converter 6b for the rear edge and the binary circuit 8. The A/D converter 6b which samples the reproduction signal and outputs a sampling value to the maximum likelihood detector 7b for the rear edge and the interpolator 12. The maximum likelihood detector 7b generates a rear edge maximum likelihood signal on the basis of a sampling value of the reproduction signal, and outputs it to the synthesizer 10. The binary circuit 8 converts the reproduction signal into a rear edge binary signal, and outputs it to the PLL circuit 9b for the rear edge. The PLL circuit 9b generates a timing clock synchronizing with the rear edge on the basis of the binary signal, and outputs it to the A/D converter 6b and the maximum likelihood detector 7b. The A/D converter 6b and the maximum likelihood detector 7b are operated in synchronism with the timing clock. The interpolator 12 determines a digital value (interpolation sampling value) for detecting the front edge through interpolation by using a sampling value from the A/D converter 6b, and outputs the determined sampling value to the front edge maximum likelihood detector 7a. The maximum likelihood detector 7a generates a front edge maximum likelihood signal, and outputs it to the synthesizer 10.

The operation will be described:

The same process of operation follows up to the LPF 5 as in Embodiment 1. The rear edge binary signal is delivered from the binary circuit 8 to the PLL circuit 9b. A timing clock synchronizing with the rear edge binary signal is delivered to the A/D converter 6b and the maximum likelihood detector 7b from the PLL circuit 9b. A sampling value is obtained by tie A/D converter 6b, and on the basis of the sampling value the transition of the maximum likelihood signal is fixed in accordance with a predetermined algorithm by the maximum likelihood detector 7b. A rear edge maximum likelihood signal is obtained on the basis of the fixed transition of the signal. The interpolator 12 determines an interpolation sampling value for detecting a front edge through interpolation performed on the basis of the rear edge sampling value obtained by the A/D converter 6b, and the determined interpolation sampling value is delivered to the maximum likelihood detector 7a. The maximum likelihood detector 7a fixes the transition of a maximum likelihood signal from the sampling value in accordance with a predetermined algorithm, and determines a front edge maximum likelihood signal on the basis of the fixed transition of the signal. The resulting front edge and rear edge maximum likelihood signals are synthesized by the synthesizer 10, and then they are demodulated by the demodulator 11. In this way a final reproduction data is obtained.

The internal structure and function of the interpolator 12 in Embodiment 2 are basically the same as that in Embodiment 1, and a description of it will be omitted. In Embodiment 2 a front edge interpolation sampling value is obtained from a sampling value sampled by a clock synchronizing with a rear edge binary signal. The stationary shift has an opposite direction to that in Embodiment 1, and therefore it is required to change the symbol dX of the stationary shift amount to dX.

In Embodiment 1 (and Embodiment 2) a digital value for detecting a rear edge (front edge) is calculated by interpolating a real sampling value obtained by sampling by a clock synchronizing with the front edge (rear edge), and a rear edge (front edge) is detected by using the digital value. The front edge (rear edge) is detected by using the real sampling value. Alternatively, two digital values may be calculated by interpolating a sampling value sampled by a clock synchronizing with a binary signal obtained by synthesizing a front edge signal and a rear edge signal. Then, a front edge and a rear edge are detected by using the digital values.

Embodiment 3

Embodiment 3 includes two A/D converters 6a and 6b for the front edge and the rear edge, and a compensator 13a and 13b which use an interpolation sampling value of the respective A/D converters to compensate a real sampling value. This is in contrast to Embodiments 1 and 2 where a single A/D converter is provided either for the front edge or the rear edge.

Figure 13:
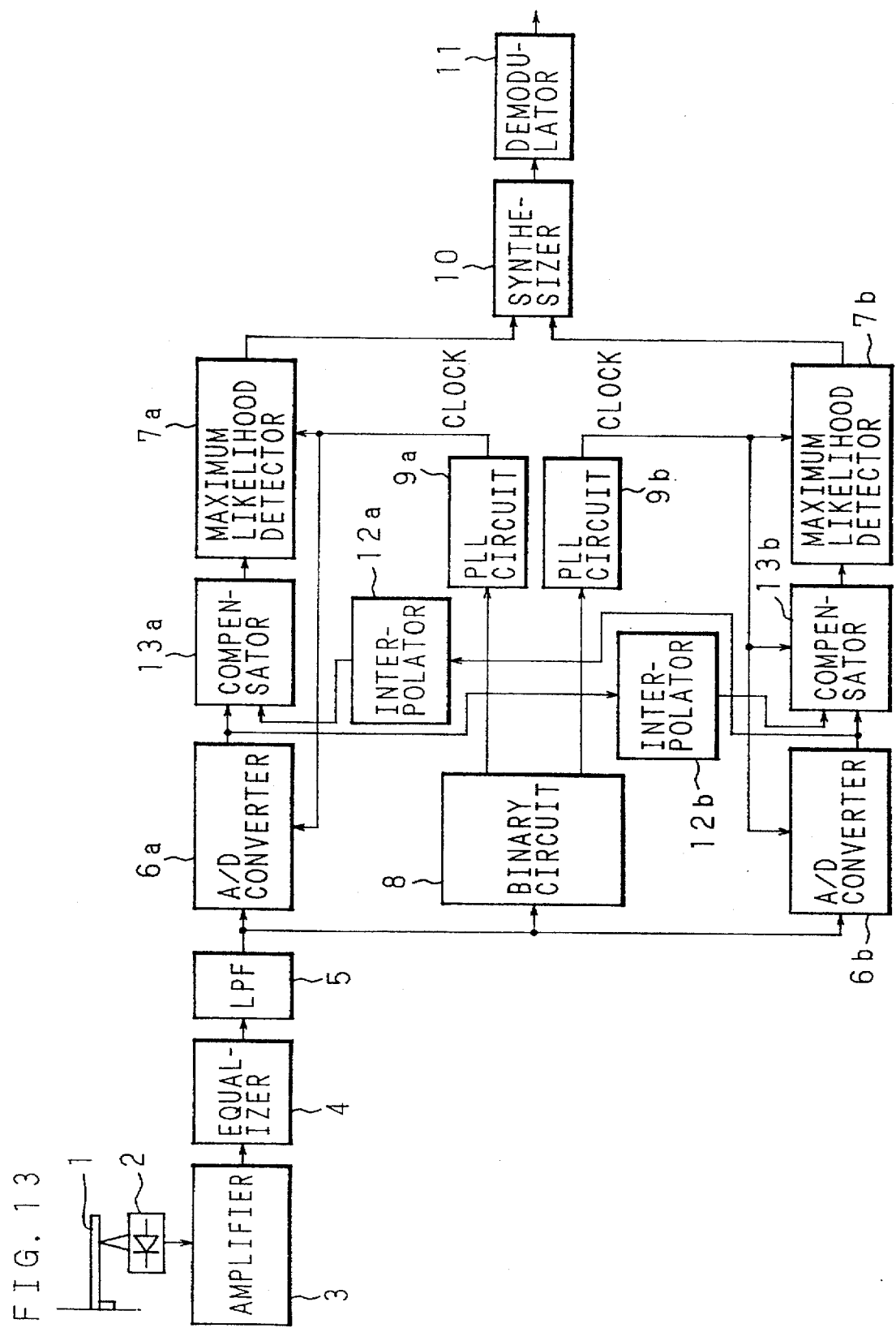
FIG. 13 is a diagrammatic view illustrating a structure of a third embodiment (detection of a maximum likelihood by mutual interpolation of a front edge and a rear edge)

Referring to FIG. 13, wherein like reference numerals designate like elements and components to those in FIGS. 4 and 12, Embodiment 3 will be more particularly described:

A waveshaped reproduction signal from the LPF 5 is inputted to the A/D converters 6a and 6b and the binary circuit 8. The A/D converter 6a for the front edge samples the waveshaped reproduction signal, and outputs the sampling value to the interpolator 12b for the rear edge and the compensator 13a for the front edge. The interpolator 12b determines a digital value (interpolation sampling value), which is used to detect a rear edge, by interpolating the sampling value from the A/D converter 6a, and outputs the interpolation sampling value to the compensator 13b for the rear edge. The A/D converter 6b for the rear edge samples the waveshaped reproduction signal and outputs the sampling value to the interpolator 12a for the front edge and the compensator 13b for the rear edge. The interpolator 12a determines a digital value (interpolation sampling value), which is used to detect a front edge, by interpolating the sampling value from the A/D converters 6b, and outputs the interpolation sampling value to the compensator 13a.

The compensator 13a uses the interpolation sampling value from the interpolator 12a to compensate the real sampling value from the A/D converter 6a, and outputs the compensated value to the front edge maximum likelihood detector 7a. The maximum likelihood detector 7a generates a front edge maximum likelihood signal on the basis of the inputted data, and outputs it to the synthesizer 10. The compensator 13b uses the interpolation sampling value from the interpolator 12b to compensate the real sampling value from the A/D converter 6b, and outputs the compensated value to the rear edge maximum likelihood detector 7b. The maximum likelihood detector 7b generates a rear edge maximum likelihood signal on the basis of the inputted data, and outputs it to the synthesizer 10.

The binary circuit 8 converts the waveshaped reproduction signal into a binary signal by using an appropriate slicing level, and after dividing it into a first portion for a front edge and a second portion for a rear edge, outputs the first portion to the PLL circuit 9a and the second portion to the PLL circuit 9b. The PLL circuit 9a generates a first timing clock synchronizing with the front edge on the basis of the first portion of binary signal, and outputs it to the corresponding A/D converter 6a, compensator 13a and maximum likelihood detector 7a all of which are operated in synchronism with the first timing clock. The PLL circuit 9b generates a second timing clock synchronizing with the rear edge on the basis of the second portion of binary signal, and outputs it to the corresponding A/D converter 6b, compensator 13b and maximum likelihood detector 7b all of which are operated in synchronism with the second timing clock.

Figure 14:
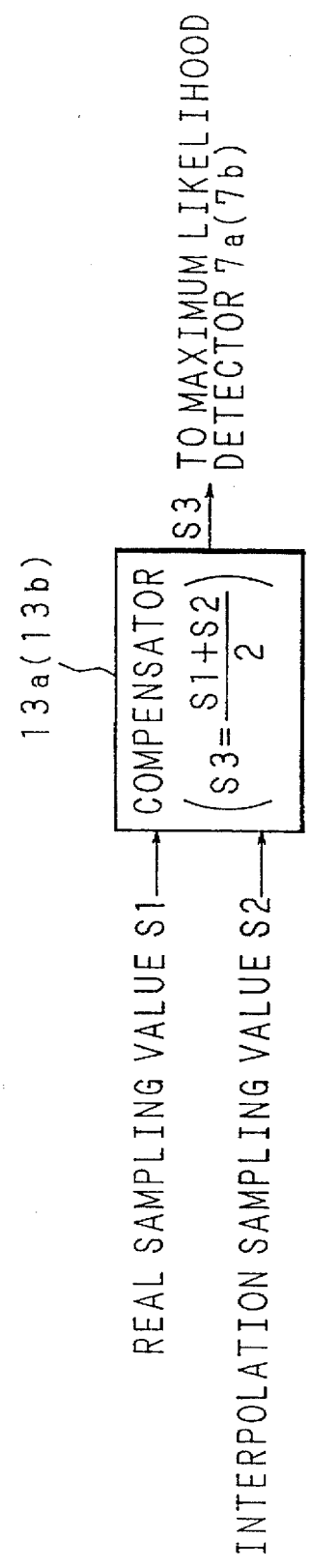
FIG. 14 is a view showing an example of compensation performed by a compensator.

FIG. 14 illustrates an example of the interpolating process in the compensator 13a (13b). A real sampling value S1 and an interpolating sampling value S2 are inputted to the compensator 13a (13b), and an average value S3 (=(S1+S2)/2) between them is outputted to the maximum likelihood detector 7a (7b) as a sampling value for detecting a maximum likelihood.

The operation of Embodiment 3 will be described:

The same process of operation follows up to the LPF 5 as in Embodiment 1. A real sampling value obtained by the A/D converter 6a (6b) is inputted to the compensator 13a (13b) and the interpolator 12b (12a). The interpolator 12b (12a) determines an interpolation sampling value for the rear edge (front edge) through interpolation performed on the basis of a real sampling value for the front edge (rear edge), and the resulting rear edge (front edge) interpolation sampling value is delivered to the compensator 13b (13a). The compensator 13a (13b) determines an average value between the front edge (rear edge) real sampling value and the interpolation sampling value and the average value is outputted to the maximum likelihood detector 7a (7b). The maximum likelihood detector 7a (7b) fixes the transition of the maximum likelihood signal from the average value (sampling value) in accordance with a predetermined algorithm, and a front edge (rear edge) maximum likelihood signal is obtained in accordance with the fixed transition of the maximum likelihood signal. The A/D converters 6a (6b), the compensator 13a (13b) and the maximum likelihood detector 7a (7b) are operated in synchronism with a timing clock generated by the PLL circuit 9a (9b) on the basis of the binary signal of the front edge (rear edge) from the binary circuit 8. After the resulting front edge and rear edge maximum likelihood signals are synthesized by the synthesizer 10, they are demodulated by the demodulator 11 to obtain a final reproduction data.

In the foregoing description the compensator 13a (13b) obtains an average value between the real sampling value and the interpolation sampling value, but the embodiments are not limited to this example. Compensation can be performed by weighing either of the sampling values.

The linear interpolation described above is an example to obtain an interpolation sampling value, and other interpolating systems can be adopted.

According to one aspect of the present invention (Embodiments 1 and 2), a stationary edge shift amount is detected in the VF0 area, and the acquired data is interpolated. This structure allows a single A/D converter to obtain a sampling value designed to detect a maximum likelihood corresponding to the detection of a front edge and a rear edge. As a result, the optical disk can be equipped with a PRML system without raising the cost. Because of the mutual interpolation, the sampling values are averaged, thereby eliminating the possibility of causing discontinuous sampling values due to a clock skew. This enhances reliability.

According to another aspect of the present invention (Embodiment 3), a first A/D converter is provided for a front edge and a second A/D converter is for a rear edge, and the sampling values obtained from the first and second A/D converters are used to calculate mutually interpolation digital values. The real sampling values are compensated with the interpolation digital values. The front edge and the rear edge are detected on the basis of the compensated values. Thus the amount of information used to detect a front edge and a rear edge is increased as compared with the prior art data reproduction device. As a result, a more sophisticated algorithm can be used to detect the required information, thereby enhancing the accuracy of the reproduction data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bound thereof are therefore intended to be embraced by the claims.

What is claimed is:

1. A data reproduction apparatus for reproducing data using front and rear edges of marks recorded in an optical disk, comprising:

means for obtaining a reproduction waveform from the optical disk;

a single A/D converter for obtaining sampling values representing each front edge in the obtained reproduction waveform;

interpolating means for obtaining interpolation digital values representing each rear edge in the obtained reproduction waveform by an interpolation calculation using the obtained sampling values; and means for reproducing data in the optical disk on the basis of the sampling value and the interpolation digital value.

2. The data reproduction apparatus according to claim 1, wherein the interpolation performed by said interpolating means is a linear interpolation.

3. A data reproduction apparatus for reproducing data using front and rear edges of marks recorded in an optical disk wherein the record data has a limited run-length and is modulated in accordance with a partial response characteristic, comprising:

means for obtaining a reproduction waveform from the optical disk;

a single A/D converter for obtaining sampling values representing each front edge in the obtained reproduction waveform;

interpolating means for obtaining interpolation digital values representing each rear edge in the obtained reproduction waveform by an interpolation calculation using the obtained sampling values; and means for reproducing the record data in the optical disk by a maximum likelihood method on the basis of the sampling value and the interpolation digital value.

4. The data reproduction apparatus according to claim 3, wherein the interpolation performed by said interpolating means is a linear interpolation.

5. A data reproduction apparatus for reproducing data using front and rear edges of marks recorded in an optical disk, comprising:

means for obtaining a reproduction waveform from the optical disk;

first A/D converting means for obtaining a first sampling value for detecting an ascending edge of the reproduction waveform;

second A/D converting means for obtaining a second sampling value for detecting a descending edge of the reproduction waveform;

first interpolation means for obtaining a first interpolation digital value through interpolation by using the sampling value obtained by said first A/D converting means;

second interpolating means for obtaining a second interpolation digital value through interpolation by using the sampling value obtained by said second A/D converting means;

first compensating means for compensating the first sampling value with the second interpolation digital value;

second compensating means for compensating the second sampling value with the first interpolation digital value; and means for reproducing data in the optical disk on the basis of the outputs from said first compensating means and said second compensating means.

6. The data reproduction apparatus according to claim 5, wherein said first compensating means outputs an average value between the first sampling value and the second interpolation digital value, and wherein said second compensating means outputs an average value between the second sampling value and the first interpolation digital value.

7. A data reproduction apparatus for reproducing data from front and rear edges of marks recorded in an optical disk wherein the data has a limited run-length and is modulated in accordance with a partial response characteristic, comprising:

means for obtaining a reproduction waveform from the optical disk;

first A/D converting means for obtaining a first sampling value for detecting an ascending edge of the reproduction waveform;

second A/D converting means for abtaining a second sampling value for detecting a descending edge of the rreproduction waveform;

first interpolating means for obtaining a first interpolation digital value through interpolation by using the sampling value obtained by said first A/D converting means;

second interpolation means for obtaining a second interpolation digital value through interpolation by using the sampling value obtained by said second A/D coverting means;

first compensating means for compensating the first sampling value with the second interpolation digital value;

second compensating means for compensating the second sampling value with the first interpolation digital value; and means for reproducing the record data inthe optical disk by a maximum likelihood method on the basic of the outputs from said first compensating means and said second compensating means.

8. The data reproduction apparatus according to claim 7, wherein said first compensating means outputs an average value between the first sampling value and the second interpolation digital value, and wherein said second compensating means outputs an average value between the second sampling value and the first interpolation digital value.

9. A data reproduction apparatus for reproducing data using front and rear edges of marks recorded in an optical disk, comprising:

means for obtaining a reproduction waveform from the optical disk:

a single A/D converter for obtaining sampling values representing each rear edge in the obtained reproduction waveform;

interpolating means for obtaining interpolation digital values representing each front edge in the obtained reproduction waveform by an interpolation calculation using the obtained sampling values; and means for reproducing data in the optical disk on the basis of the sampling values and the interpolation digital values.

10. The data reproduction apparatus according to claim 9, wherein the interpolation performed by said interpolating means is a linear interpolation.

11. A data reproduction apparatus for reproducing data using rear edges of marks recorded in an optical disk wherein the record data has a limited run-length and is modulated in accordance with a partial response characteristic, comprising:

means for obtaining a reproduction waveform from the optical disk;

a single A/D converter for obtaining sampling values representing each rear edge in the obtained reproduction waveform;

interpolating means for obtaining interpolation digital values representing each front edge in the obtained reproduction waveform by an interpolation calculation using the obtained sampling values; and means for reproducing the record data in the optical disk by a maximum likelihood method on the basis of the sampling value and the interpolation digital value.

12. The data reproduction apparatus according to claim 11, wherein the interpolation performed by said interpolating means is a linear interpolation.

* * * * *

UNITED STATES PATENT AND TRADEMARK OFFICE
CERTIFICATE OF CORRECTION

PATENT NO. : 5,745,464
DATED : April 28, 1998
INVENTOR(S) : Taguchi et al.

It is certified that error appears in the above-identified patent and that said Letters Patent is hereby corrected as shown below:

Title page, "[30] Foreign Application Priority" delete "Dec. 6" and insert --June 12-- therefor Column 2, line 17, delete "57b" and insert --56b-- therefor Column 3, line 24, delete "samples" and insert --sample-- therefor Column 3, line 24, delete "signal" and insert --signals-- therefor Column 4, line 7, before "provide" insert --to--

UNITED STATES PATENT AND TRADEMARK OFFICE
CERTIFICATE OF CORRECTION

PATENT NO. : 5,745,464
DATED : April 28, 1998
INVENTOR(S) : Taguchi et al.

Page 2 of 5

It is certified that error appears in the above-identified patent and that said Letters Patent is hereby corrected as shown below:

Column 4, line 67, delete "in the" and insert

--on the-- therefor

Column 6, line 44, delete "VF0" and insert

--VFO-- therefor

Column 6, line 45, delete "VF0" and insert

--VFO-- therefor

Column 6, line 47, delete "VF0" and insert

--VFO-- therefor

Column 7, line 15, delete "VF0" and insert

--VFO-- therefor

UNITED STATES PATENT AND TRADEMARK OFFICE
CERTIFICATE OF CORRECTION

PATENT NO. : 5,745,464
DATED : April 28, 1998
INVENTOR(S) : Taguchi et al.

It is certified that error appears in the above-identified patent and that said Letters Patent is hereby corrected as shown below:

Column 7, line 18, delete "VF0" and insert --VFO-- therefor

Column 7, line 24, delete "$Y_{31}$" and insert --$y_{31}$-- and after "$y_{02}$" delete ")" therefor Column 7, line 43, delete "y intercept" and insert --y-intercept-- therefor Column 7, line 51, delete "}×2]" and insert --}×X2]-- therefor Column 7, line 61, delete "ex-pressed" and insert --expressed-- therefor Column 7, line 64, delete "a= (Y1-+" and insert --a= (-Y1+-- therefor

UNITED STATES PATENT AND TRADEMARK OFFICE
CERTIFICATE OF CORRECTION

PATENT NO. : 5,745,464
DATED : April 28, 1998
INVENTOR(S) : Taguchi et al.

It is certified that error appears in the above-identified patent and that said Letters Patent is hereby corrected as shown below:

Column 8, line 14, delete "VF0" and insert

--VFO-- therefor

Column 8, line 26, delete "VF0" and insert

--VFO-- therefor

Column 8, line 35, delete "b - y2" and insert

--b = y2-- therefor

Column 8, line 42, delete "-x" and insert

--x-- therefor

Column 9, line 21, delete "VF0" and insert

--VFO-- therefor

Column 10, line 44, delete "dx" and insert

--dX--    therefor

UNITED STATES PATENT AND TRADEMARK OFFICE
CERTIFICATE OF CORRECTION

PATENT NO. : 5,745,464
DATED : April 28, 1998
INVENTOR(S) : Taguchi et al.

It is certified that error appears in the above-identified patent and that said Letters Patent is hereby corrected as shown below:

Column 12, line 28, delete "VF0" and insert --VFO-- therefor

Column 14, line 11, delete "rreproduction" and insert --reproduction-- therefor

Column 14, line 25, delete "inthe" and insert --in the-- therefor

Column 14, line 26, delete "basic" and insert --basis-- therefor

Signed and Sealed this

Twenty-second Day of December, 1998

Attest:

BRUCE LEHMAN

*Attesting Officer*      *Commissioner of Patents and Trademarks*